US008712203B2

(12) United States Patent
Goossen

(10) Patent No.: US 8,712,203 B2
(45) Date of Patent: Apr. 29, 2014

(54) FORMATION OF AN OPTICAL WAVEGUIDE

(75) Inventor: Keith Goossen, Howell, NJ (US)

(73) Assignee: Empire Technology Development, LLC, Wilmington, DE (US)

( * ) Notice: Subject to any disclaimer, the term of this patent is extended or adjusted under 35 U.S.C. 154(b) by 242 days.

(21) Appl. No.: 13/148,166

(22) PCT Filed: Nov. 3, 2010

(86) PCT No.: PCT/IB2010/003133
§ 371 (c)(1),
(2), (4) Date: Aug. 5, 2011

(87) PCT Pub. No.: WO2012/059779
PCT Pub. Date: May 10, 2012

(65) Prior Publication Data
US 2012/0106974 A1    May 3, 2012

(51) Int. Cl.
*G02B 6/10* (2006.01)

(52) U.S. Cl.
USPC ........................................... 385/132

(58) Field of Classification Search
USPC ................................. 385/129–132
See application file for complete search history.

(56) References Cited

U.S. PATENT DOCUMENTS

| | | | |
|---|---|---|---|
| 7,046,879 B2 | 5/2006 | Kapusta et al. | |
| 7,095,920 B1 | 8/2006 | Little | |
| 7,352,066 B2 | 4/2008 | Budd et al. | |
| 7,373,062 B2 | 5/2008 | Huber | |
| 2005/0031284 A1* | 2/2005 | Blalock et al. | 385/129 |
| 2005/0220406 A1* | 10/2005 | Jones et al. | 385/37 |
| 2006/0233505 A1* | 10/2006 | Zheng et al. | 385/129 |
| 2010/0265737 A1* | 10/2010 | Kim | 362/602 |

FOREIGN PATENT DOCUMENTS

WO    2005/031417    4/2005

OTHER PUBLICATIONS

PCT International Search Report PCT/ISA/210 for PCT/IB10/003133 dated May 11, 2011.
PCT Written Opinion of the International Searching Authority PCT/ISA/237 for PCT/IB10/003133 dated May 11, 2011.
Thacker et al. "Optical Through-Wafer Interconnects for 3D Hyper-Integration"; Lasers and Electro-Optics Society (2006), 28-29.
Wu et al. "A High Aspect-Ratio Silicon Substrate-Via Technology and Applications: Through-Wafer Interconnects for Power and Ground and Faraday Cages for SOC Isolation"; Electron Devices Meeting, IEDM Technical Digest (2000), 477-480.
Impens et al. "Through characterization of a silicon oxynidtride coated silica gel synthesized via chemical surface coating"; J. Mater. Chem. (1997), 7(8): 1467-1472.

(Continued)

*Primary Examiner* — Charlie Peng
*Assistant Examiner* — Mary El Shammaa
(74) *Attorney, Agent, or Firm* — Moritt Hock & Hamroff LLP; Steven S. Rubin, Esq.

(57) ABSTRACT

Technologies are generally described for an optical waveguide, methods and systems effective to form an optical waveguide, and an optical system including an optical waveguide. In some examples, the optical waveguide may include a silicon oxynitride region in a wall of the silicon substrate. The silicon oxynitride region may define an inner region of the optical waveguide. The wall may define a via. The optical waveguide may include a silicon oxide region in the substrate. The silicon oxide region may define an outer region of the optical waveguide adjacent to the inner region.

20 Claims, 5 Drawing Sheets

(56) References Cited

OTHER PUBLICATIONS

Hussein et al. "Stability of low refractive index PECVD silicon oxynitride layers"; Proceedings Symposium IEEE/LEOS Benelux Chapter (2003): 77-80.

Gower "Excimer laser microfabrication and micromachining"; Riken Review (2001), 32: 50-56.

"Excimer lasers drill small holes in plastic packages and metal containers"; retrieved from Resonetics.corn on Aug. 19, 2010.

Mroczynski et al. "Silicon oxynitride layers fabricated by Plasma Enhanced Chemical Vapor Deposition (PECVD) for CMOS devices"; Institute of Microelectrics and Optoelectronics, Warsaw University of Technology (2009).

"Growth and Characterization of Ultrathin Silicon Oxynitride Films"; retrieved from physics.rutgers.edu on Aug. 18, 2010.

Kim et al. "Low Optical Loss Perfluorinated Methacrylates for a Single-Mode Polymer Waveguide"; Chem. Mater. (2005), 17(5): Abstract.

Sandland et al. "Silicon Oxynitride Waveguide Materials for Microphotonics"; retrieved from photonics.mit.edu Aug. 18, 2010.

"List of refractive indices" retrieved from Wikipedia on Aug. 18, 2010.

"Excimer Laser" retrieved from Wikipedia on Aug. 19, 2010.

"Optical Fiber" retrieved from Wikipedia on Aug. 18, 2010.

Chen et al. "Deposition of silicon oxynitride films by ion beam sputtering at room temperature" Optical Review, Abstract downloaded from www.springerlink.com on Aug. 18, 2010, 16(2): 226-228.

"Silicon Oxynitride ($S_{12}N_{2}O$)"; NIST Property Data Summaries, downloaded from www.ceramics.nist.gov on Aug. 18, 2010.

Liao et al. "Physical and electrical characteristics of silicon oxynitride films with various refractive indices"; Applied Physics (2009), 42(17): Abstract.

Soh et al. "Ultra-Low Resistance, Through-Wafer Via (TWV) Technology and Its Applications in Three Dimensional Structures on Silicon"; Jpn. J. Appl. Phys. (1999) 38: 2393-2396.

Campbell "Thermal Oxidation Process"; The science and engineering of microelectronic Fabrication, Oxford University Press (2011), 2(4): 68-97.

Germann et al. "Silicon Oxynitride Layers for Optical Waveguide Applications"; Journal of the Electrochemical Society (2000) 147(6): 2237-2241.

\* cited by examiner

250

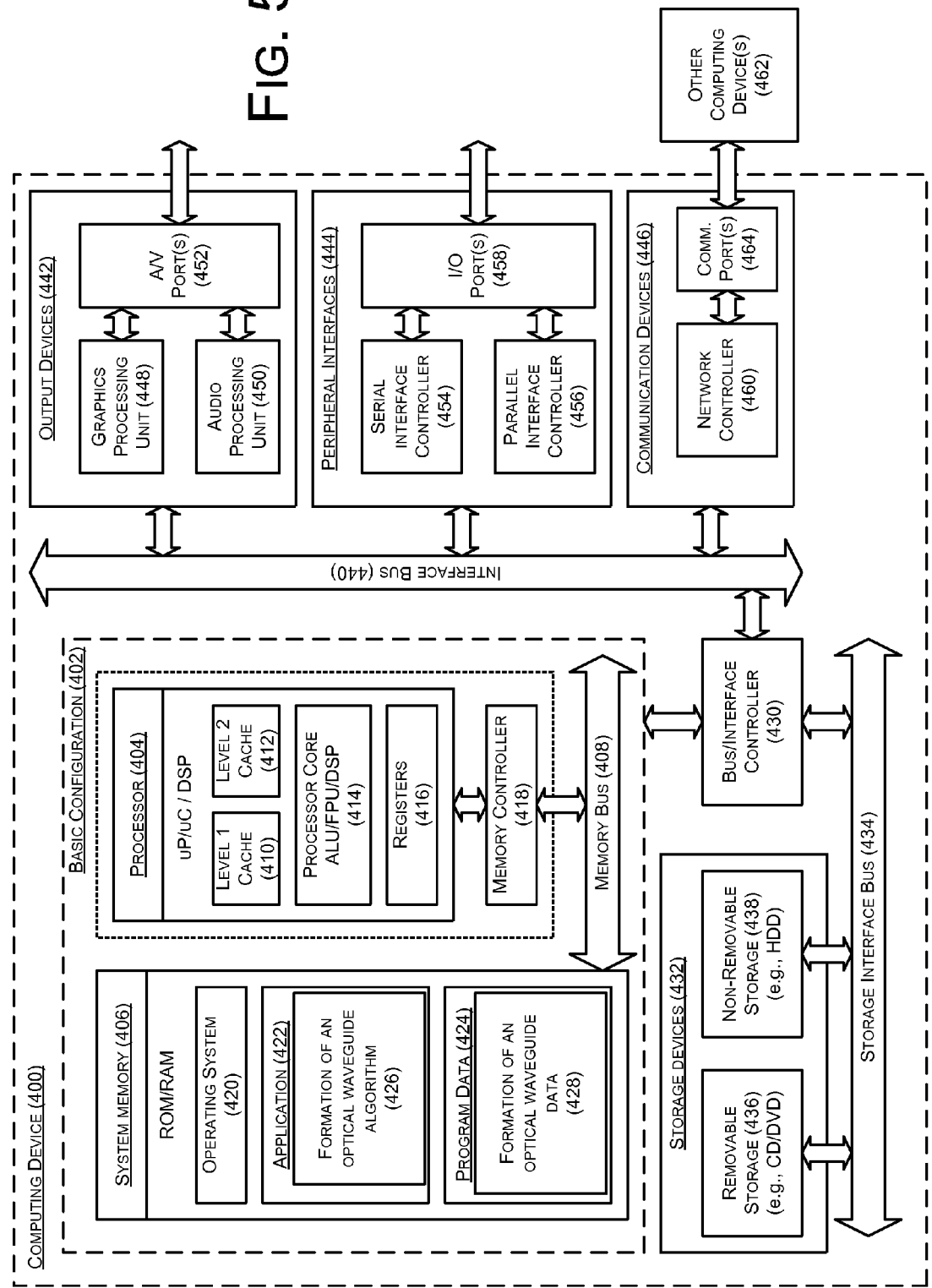

FORMATION OF AN OPTICAL WAVEGUIDE

CROSS REFERENCE TO RELATED APPLICATIONS

This application is a 371 of International Application No. PCT/IB2010/003133 filed Nov. 3, 2010, the entirety of which is hereby incorporated by reference.

BACKGROUND

Unless otherwise indicated herein, the materials described in this section are not prior art to the claims in this application and are not admitted to be prior art by inclusion in this section.

In three-dimensional stacked integrated circuits, one integrated circuit in the stack may be adapted to communicate with another integrated circuit. The communication may be performed electrically through, for example, an electrically conductive path. The communication may also be performed using optical communication through an optical waveguide.

SUMMARY

In an example, an optical waveguide formed in a silicon substrate is generally described. An example optical waveguide may include a silicon oxynitride region in a wall of the silicon substrate. The silicon oxynitride region may define an inner region of the optical waveguide and the wall may define a via. The optical waveguide may include a silicon oxide region in the substrate. The silicon oxide region may define an outer region of the optical waveguide adjacent to the inner region.

In an example, a method of forming an optical waveguide in a silicon substrate is generally described. An example method may include forming a silicon oxynitride region in a wall of the silicon substrate. The silicon oxynitride region may define an inner region of the optical waveguide, and the wall may define a via. The method may further include forming a silicon made region in the silicon substrate. The silicon oxide region may define an outer region of the optical waveguide adjacent to the inner region.

In an example, an optical communication system including an optical waveguide formed in a silicon substrate is generally described. An example optical communication system may include an optical signal transmitter and an optical signal receiver. The optical signal receiver may be in communication with the optical signal transmitter through the optical waveguide. The optical waveguide may include a silicon oxynitride region in a wall of the silicon substrate. The silicon oxynitride region may define an inner region of the optical waveguide and the wall may define a via. The optical waveguide may include a silicon oxide region in the substrate. The silicon oxide region may define an outer region of the optical waveguide adjacent to the inner region.

In an example, a system effective to form an optical waveguide in a silicon wafer is generally described. The wafer may include a wall defining a via. An example system may include a reaction chamber, a first source of a first gas, a second source of a second gas, a heat source, and a processor. The first gas may include nitrogen. The first source may be configured in communication with the reaction chamber. The second gas may include oxygen. The second source may be configured in communication with the reaction chamber. The heat source may be operatively associated with the reaction chamber. The processor may be configured in communication with the reaction chamber, the first source, the second source, and the heat source. The processor may be configured to operate the first source, second source, and the heat source so as to form a silicon oxynitride region in the wall of the silicon substrate. The silicon oxynitride region may define an inner region of the optical waveguide. The processor may be configured to operate the first source, second source, and the heat source so as to form a silicon oxide region in the substrate. The silicon oxide region may define an outer region of the optical waveguide adjacent to the inner region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is a block diagram illustrating an example computing device that is arranged to implement formation of an optical waveguide;

Figure 1:
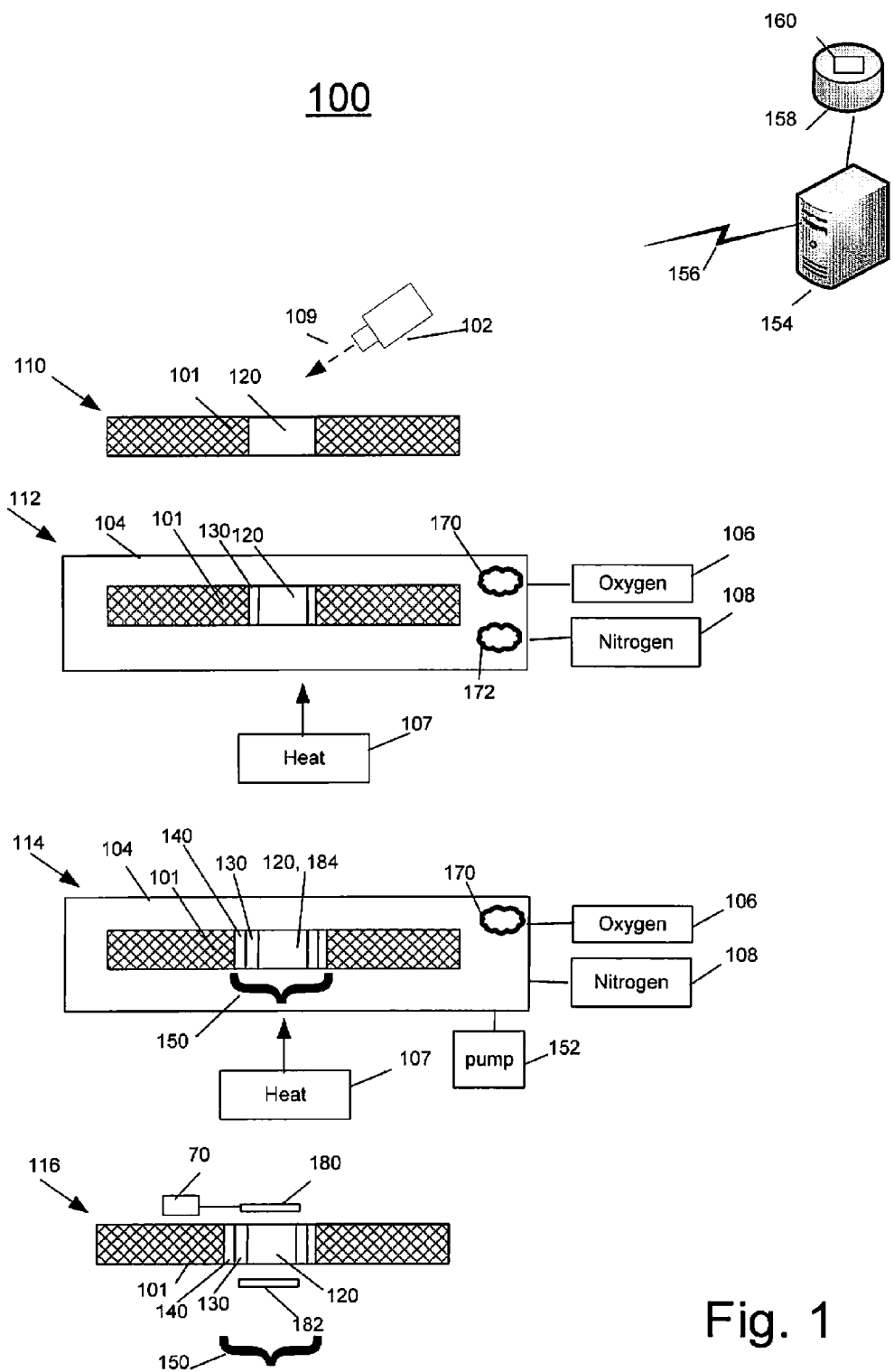
FIG. 1 illustrates an example system that can be utilized to implement formation of an optical waveguide.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, materials and apparatus related to forming an optical waveguide.

Briefly stated, technologies are generally described for an optical waveguide, methods and systems effective to form an optical waveguide, and an optical system including an optical waveguide. In some examples, the optical waveguide may include a silicon oxynitride region in a wall of the silicon substrate. The silicon oxynitride region may define an inner region of the optical waveguide. The wall may define a via. The optical waveguide may include a silicon oxide region in the substrate. The silicon oxide region may define an outer region of the optical waveguide adjacent to the inner region.

Other than in the working examples or where otherwise indicated, at least some numbers expressing amounts of materials, reaction conditions, time durations, quantified properties of materials, and so forth, stated in the specification and claims are to be understood as being modified by the term "about."

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates a system that can be utilized to implement formation of an optical waveguide arranged according to at least some embodiments described herein. An example optical waveguide formation system 100 may include a via forming apparatus 102, a reaction chamber 104, a heat source 107 an oxygen gas source 106 and/or a nitrogen gas source 108. At least some of these elements may be arranged in communication with a processor 154 through a communication link 156. In some examples, processor 154 may be in adapted in communication with a memory 158 that includes instructions 160 stored therein. Processor 154 may be configured, such as by instructions 160, to control at least some of the operations, functions or actions described below.

As shown at 110, a via 120 may be formed in a silicon substrate 101 by any suitable method. In an example, a via forming apparatus 102 may include an excimer laser configured to apply a beam of light 109. Beam of light 109 may be effective to form via 120 through silicon substrate 101, of any size suitable for the fabrication of a waveguide as is discussed below. In other examples, via forming apparatus 102 may include one or more of a reactive ion etching device, a plasma etching device, an ion beam milling device, or an electrochemical etching device, etc.

As shown at 112, silicon substrate 101 including via 120 may be placed in reaction chamber 104. In an example, reaction chamber 104 may include an oven or other heating chamber. Reaction chamber 120 may be heated by heat source 107 to, and maintained at, a reaction temperature in a range from about 1,000 to about 1,500 degrees Celsius. In an example, heat source 107 may be configured to increase the temperature in reaction chamber 104 from an ambient temperature up to the reaction temperature at a rate of about 10° Celsius per sec.

In an example, processor 154 may be configured to operate gas sources 106, 108 to introduce a gas into reaction chamber 104. In an example, the gas may include nitrogen 172 from nitrogen source 108 and oxygen 170 from oxygen source 106. Nitrogen gas 172 may react with silicon in silicon substrate 101 to form a region of silicon oxynitride 130 in walls defining via 120. For example, nitrogen gas 172 may be nitrogen oxide such as, for example, $N_2O$, or the gas may comprise a mixture of gases such as ammonia ($NH_3$) and oxygen, or a mixture of nitrogen and oxygen, such as air. Silicon oxynitride region 130 may be effective to define a region of an optical waveguide as discussed in more detail below. Silicon oxynitride region 130 may be transparent to wavelengths of light to be transmitted through the waveguide and typically has an index of refraction of about 1.46 to about 2.3.

As shown at 114, processor 154 may be configured to operate gas sources 106, 108 to selectively stop the supply of nitrogen 172 from nitrogen source 108 and selectively provide or continue the supply of oxygen 170 from oxygen source 106. In an example, gas introduced into reaction chamber 104 may be abruptly switched to exclude nitrogen 172. For example, processor 154 may be configured to operate gas source 108 to stop supply of nitrogen 172 and operate a vacuum pump 152 to remove nitrogen 172 from reaction chamber 104. In an example, processor 154 may be configured to operate gas sources 106, 108 to gradually increase a ratio of oxygen gas 170 to nitrogen gas 172 until substantially pure oxygen gas 170 is introduced into reaction chamber 104.

Oxygen gas 170 may permeate silicon oxynitride region 130 to contact and react with the silicon underlying the silicon oxynitride region 130. This reaction may form a region 140 of silicon oxide adjacent to silicon oxynitride region 130. Silicon oxide region 140 may form an outer region of an optical waveguide 150. In an example, silicon oxide may have an index of refraction in a range of about 1.45 to about 1.46. Optical waveguide 150 may have a vacant core or a core filled with a suitable transparent material 184. For example, material 184 may include polymers such as acrylates, siloxanes, polyimides, epoxies, etc.

Introduction of gases 170, 172 may each be maintained for a reaction time in a range of about 10 minutes to about 20 minutes, which can be varied depending on the reaction temperature and the depth of the silicon oxynitride and silicon oxide regions desired. A reaction temperature of about 1,100 degrees Celsius may be utilized to form an annular optical waveguide where regions 130 and 140 each have a thickness individually ranging from about 1 micron to about 10 microns.

As shown at 116, an optical communication system can include an optical signal transmitter 180, an optical signal receiver 182 and waveguide 150. Waveguide 150 may be disposed between optical signal transmitter 180 and optical signal receiver 182. Waveguide 150 may include a core of silicon oxynitride region 130 and a cladding in the form of silicon oxide region 140 disposed around the core 130. An integrated circuit 70 may be in communication with optical signal transmitter 180.

Figure 2:
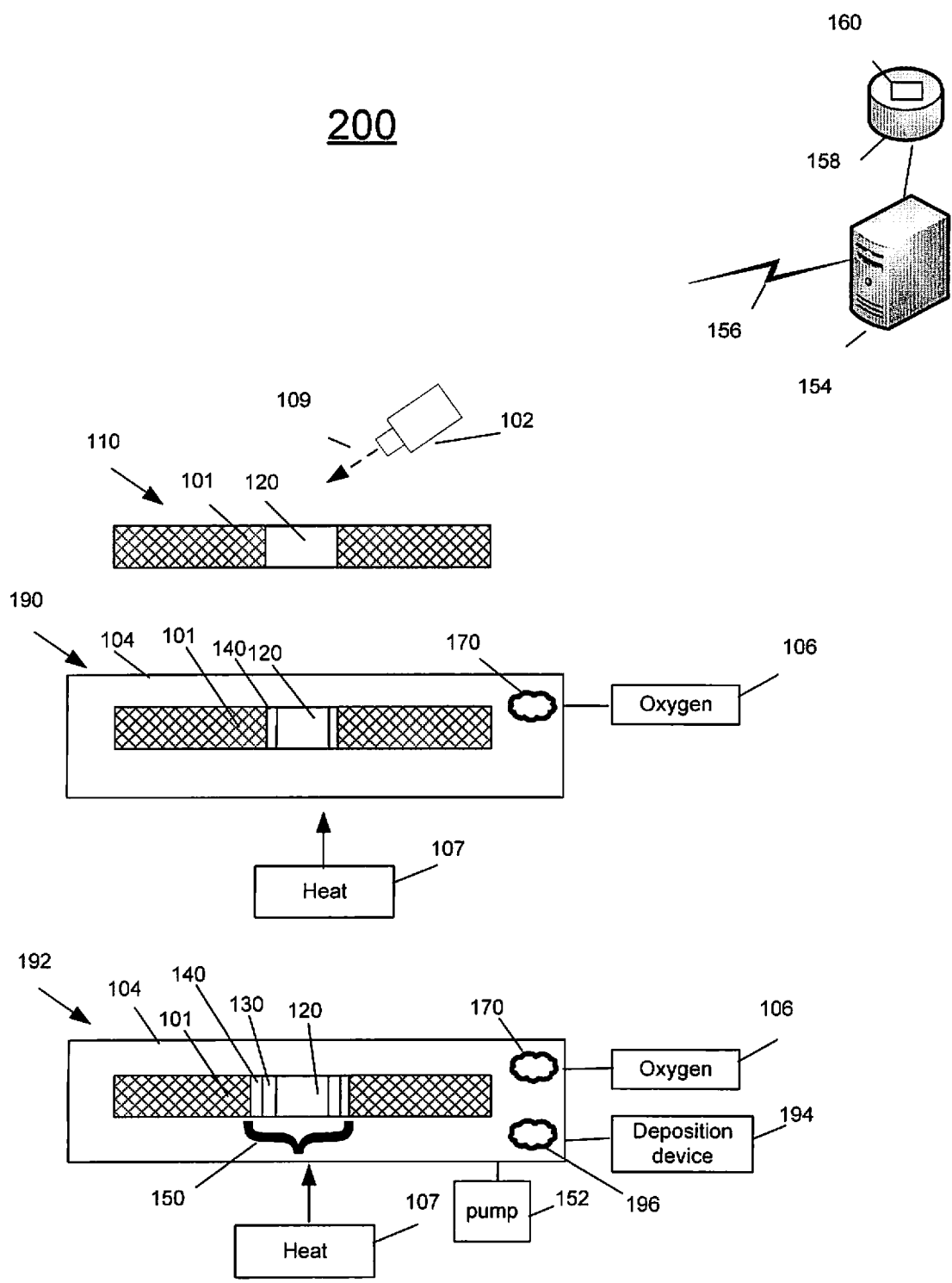
FIG. 2 illustrates an example system that can be utilized to implement formation of an optical waveguide.

FIG. 2 illustrates some example systems 200 that can be utilized to implement formation of an optical waveguide arranged in accordance with at least some embodiments described herein. System 200 of FIG. 2 is substantially similar to system 100 of FIG. 1, with additional details. Those components in FIG. 2 that are labeled identically to components of FIG. 1 will not be described again for the purposes of clarity.

As shown at 110, in some examples, via 120 may be formed in a silicon substrate 101 as discussed above. As shown at 190, processor 154 may be configured to operate gas source 106 to supply oxygen gas 170 to reaction chamber 104. Oxygen gas 170 may react with silicon of substrate 100 to form region 140 of silicon oxide using thermal oxidation or vapor deposition techniques as discussed above. Silicon oxynitride region 130 can thereafter be formed. Processor 154 may be configured to operate a deposition device 194 to supply a gas including nitrogen 196 such as $N_2$ or $NH_3$ into chamber 104. Gas 196 may be effective to deposit silicon oxynitride region 130 on silicon oxide region 140 by chemical vapor deposition (CVD), plasma vapor deposition (PVD) or any other deposition technique suitable for the purposes described herein.

Figure 3:
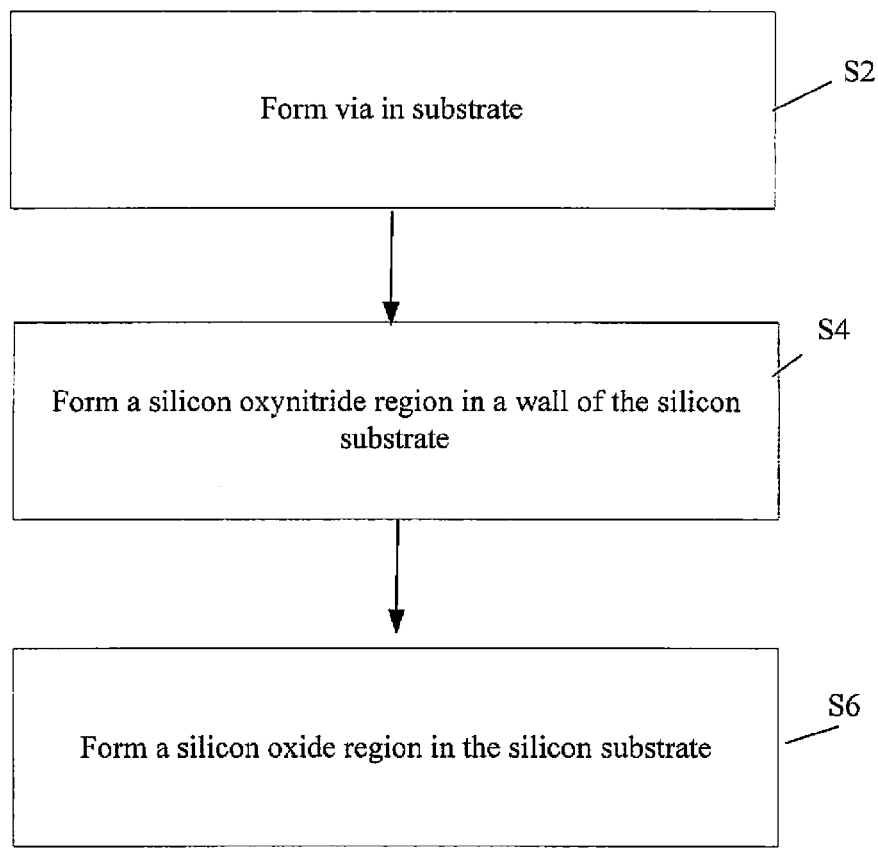
FIG. 3 depicts a flow diagram for an example process for implementing formation of an optical waveguide.

FIG. 3 depicts a flow diagram for an example process 250 for forming an optical waveguide in accordance with at least some embodiments described herein. The process in FIG. 3 could be implemented using, for example, the systems discussed above. An example process may include one or more operations, actions, or functions as illustrated by one or more of blocks S2, S4 and/or S6. Although illustrated as discrete blocks, various blocks may be divided into additional blocks, combined into fewer blocks, or eliminated, depending on the desired implementation. Processing may begin at block S2.

At block S2, "FORM VIA IN SUBSTRATE", a via forming apparatus may be configured to form a via in a silicon substrate. In some examples, the via forming apparatus may include a laser. In some examples, the via may be formed by reactive ion etching, plasma etching, ion beam milling or electrochemical etching. Processing may continue from block S2 to block S4.

At block S4, "FORM A SILICON OXYNITRIDE REGION IN A WALL OF THE SILICON SUBSTRATE", a processor may be configured to operate a nitrogen source to supply a gas including nitrogen to the substrate to form a silicon oxynitride region in a wall of the silicon substrate. In some examples, the silicon oxynitride region defines an inner region of the optical waveguide. The wall may define the via of the substrate. In some examples, the silicon oxynitride region may be formed by heating the silicon substrate in a gas including nitrogen in a reaction chamber. In some examples, the silicon oxynitride region may be formed by vapor deposition techniques. Processing may continue from block S4 to block S6.

At block S6, "FORM A SILICON OXIDE REGION IN THE SILICON SUBSTRATE", a processor may be configured to operate an oxygen source to form a silicon oxide region in the silicon substrate. The silicon oxide region may define an outer region of the optical waveguide adjacent to the inner region.

Figure 4:
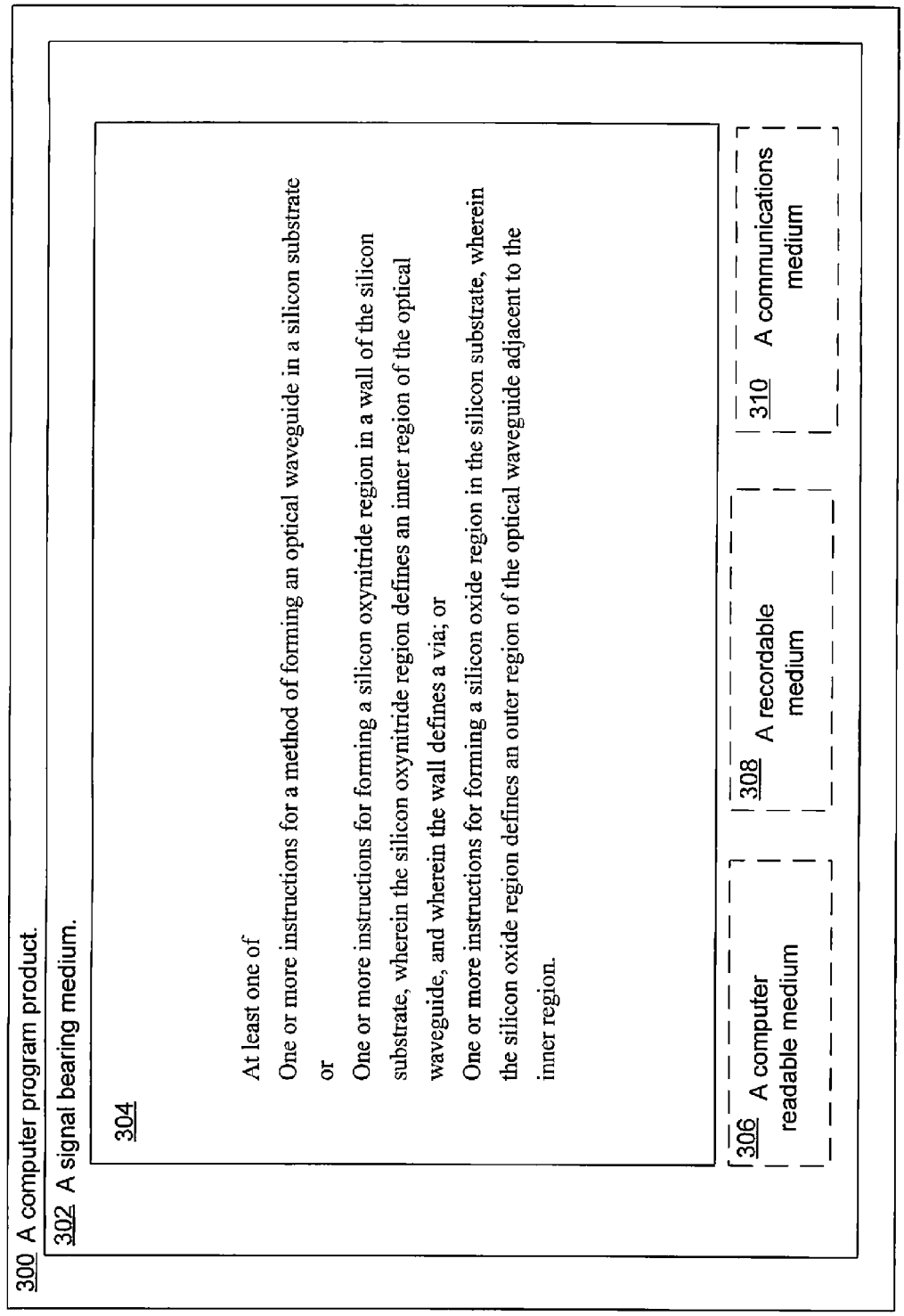
FIG. 4 illustrates a computer program product that can be utilized to implement formation of an optical waveguide.

FIG. 4 illustrates computer program products for implementing formation of an optical waveguide arranged according to at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to systems 100 and 200, processor 154 may undertake one or more of the blocks shown in FIG. 4 in response to instructions 304 conveyed to system 100 and/or 200 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 5 is a block diagram illustrating an example computing device for implementing formation of an optical waveguide arranged according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$c), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424.

Application 422 may include a formation of an optical waveguide algorithm 426 that is arranged to perform the functions as described herein including those described previously with respect to FIGS. 1-4. Program data 424 may include formation of an optical waveguide data 428 that may be useful for implementing formation of an optical waveguide as is described herein. In some embodiments, application 422 may be arranged to operate with program data 424 on operating system 420 such that formation of an optical waveguide may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An optical waveguide formed in a silicon substrate, the optical waveguide comprising:
   a silicon oxynitride region in a wall of the silicon substrate, wherein the silicon oxynitride region defines an inner region of the optical waveguide and wherein the wall defines a via; and
   a silicon oxide region in the substrate, wherein the silicon oxide region defines an outer region of the optical waveguide adjacent to the inner region.

2. The optical waveguide of claim 1, wherein the outer region is between the inner region and silicon of the silicon substrate.

3. The optical waveguide of claim 1, wherein the inner region includes an annular cross-section.

4. The optical waveguide of claim 3, further comprising a polymeric resin in the inner region.

5. A method of forming an optical waveguide in a silicon substrate, the method comprising:
   forming a silicon oxynitride region in a wall of the silicon substrate, wherein the silicon oxynitride region defines an inner region of the optical waveguide, and wherein the wall defines a via; and
   forming a silicon oxide region in the silicon substrate, wherein the silicon oxide region defines an outer region of the optical waveguide adjacent to the inner region.

6. The method of claim 5, further comprising forming the via in the silicon substrate.

7. The method of claim 5, further comprising forming a via in the silicon substrate by performing at least one of laser drilling, reactive ion etching, plasma etching, ion beam milling, or electrochemical etching.

8. The method of claim 5, further comprising forming the inner region by reacting the silicon substrate with a gas including nitrogen, in a reaction chamber.

9. The method of claim 8, wherein the gas includes a gas selected from a group consisting of nitrous oxide, ammonia, and nitrogen/oxygen mixtures.

10. The method of claim 8, wherein the reaction conditions include a temperature in a range of from about 1000 degrees Celsius to about 1500 degrees Celsius.

11. The method of claim 5, further comprising forming the outer region by reacting the silicon substrate with a gas including oxygen, in a reaction chamber.

12. The method of claim 5, further comprising:
   forming the inner region by reacting the silicon substrate with a first gas including nitrogen, in a reaction chamber; and
   forming the outer region by reacting the silicon substrate with a second gas including oxygen, in the reaction chamber.

13. The method of claim 5, further comprising forming the outer region prior to forming the inner region.

14. The method of claim 5, further comprising forming the inner region prior to forming the outer region.

15. The method of claim 13, further comprising forming the inner region by at least one of chemical vapor deposition or plasma vapor deposition.

16. An optical communication system including an optical waveguide formed in a silicon substrate, the optical communication system comprising:
   an optical signal transmitter; and
   an optical signal receiver, wherein the optical signal receiver is configured to be in communication with the optical signal transmitter through the optical waveguide; and
   wherein the optical waveguide includes:
   a silicon oxynitride region in a wall of the silicon substrate, wherein the silicon oxynitride region defines an inner region of the optical waveguide and wherein the wall defines a via; and
   a silicon oxide region in the silicon substrate, wherein the silicon oxide region defines an outer region of the optical waveguide adjacent to the inner region.

17. The optical communication system of claim 16, wherein the silicon substrate includes an integrated circuit configured to be in communication with the optical signal transmitter.

18. A system effective to form an optical waveguide in a silicon wafer, wherein the wafer includes a wall that defines a via, the system comprising:
   a reaction chamber;
   a first source of a first gas, wherein the first gas includes nitrogen, and wherein the first source is configured to be in communication with the reaction chamber;
   a second source of a second gas, wherein the second gas includes oxygen, and wherein the second source is configured to be in communication with the reaction chamber;
   a heat source, wherein the heat source is operatively associated with the reaction chamber;
   a processor, wherein the processor is configured to be in communication with the reaction chamber, the first source, the second source, and the heat source, and wherein the processor is configured to operate the first source, second source, and the heat source so as to
   form a silicon oxynitride region in the wall of the silicon substrate, wherein the silicon oxynitride region defines an inner region of the optical waveguide; and
   form a silicon oxide region in the substrate, wherein the silicon oxide region defines an outer region of the optical waveguide adjacent to the inner region.

19. The system of claim 18, further comprising a via forming apparatus,
   wherein the processor is configured to be in communication with the via forming apparatus.

20. The system of claim 19, wherein the via forming apparatus includes at least one of a laser drilling apparatus, a reactive ion etching apparatus, a plasma etching apparatus, an ion beam milling apparatus, or an electrochemical etching apparatus.

* * * * *

UNITED STATES PATENT AND TRADEMARK OFFICE
CERTIFICATE OF CORRECTION

PATENT NO. : 8,712,203 B2  
APPLICATION NO. : 13/148166  
DATED : April 29, 2014  
INVENTOR(S) : Goossen Page 1 of 1

It is certified that error appears in the above-identified patent and that said Letters Patent is hereby corrected as shown below:

On the Title Page, Item (56), under "OTHER PUBLICATIONS", in Column 2, Line 11, delete "oxynidtride" and insert -- oxynitride --, therefor.

In the Specification

Column 1, Line 39, delete "silicon made" and insert -- silicon oxide --, therefor.

Column 3, Line 41, delete "Reaction chamber 120" and insert -- Reaction chamber 104 --, therefor.

Signed and Sealed this  
Second Day of December, 2014

Michelle K. Lee  
*Deputy Director of the United States Patent and Trademark Office*